United States Patent

Masuhara et al.

[11] Patent Number: 6,118,756
[45] Date of Patent: Sep. 12, 2000

[54] RECORDING MEDIUM MASTER PRODUCTION METHOD AND RECORDING MEDIUM

[75] Inventors: Shin Masuhara, Tokyo; Masanobu Yamamoto, Kanagawa, both of Japan

[73] Assignee: Sony Corporation, Tokyo, Japan

[21] Appl. No.: 09/019,706

[22] Filed: Feb. 6, 1998

[30] Foreign Application Priority Data

Feb. 7, 1997 [JP] Japan ..................................... 9-025495

[51] Int. Cl.$^7$ ....................................................... G11B 7/24
[52] U.S. Cl. ................................... 369/275.4; 369/275.1; 369/278; 430/321
[58] Field of Search ............................. 369/275.4, 275.1, 369/275.2, 275.3, 278, 124, 48, 54, 59, 277, 44.26, 44.34, 44.13, 58, 44.16, 279; 430/321

[56] References Cited

U.S. PATENT DOCUMENTS 5,537,373 7/1996 Fuji ....................... 369/275.4

*Primary Examiner*—Ali Neyzari
*Attorney, Agent, or Firm*—Ronald P Kananen; Rader, Fishman & Grauer

[57] ABSTRACT

A recording medium of one-side address method capable of easily detecting a synchronous signal and production method of recording medium master used for such a recording medium. The recording medium master production method includes a photo-sensitive layer exposure step using a first beam and a second beam for exposure of walls of a groove in a straight line, wherein for exposure of an area where a synchronous signal is to be recorded, the second beam alone is used while being wobbled according to the synchronous signal. Moreover, the recording medium according to the present invention has at least a groove formed on a recording plane including: an area having no synchronous signal recorded where one of the walls of the groove is formed straight and the other wall of the groove is at least partially meandered according to an address signal; and an area having a synchronous signal recorded where both of the walls of the groove are meandered according to the synchronous signal.

4 Claims, 10 Drawing Sheets

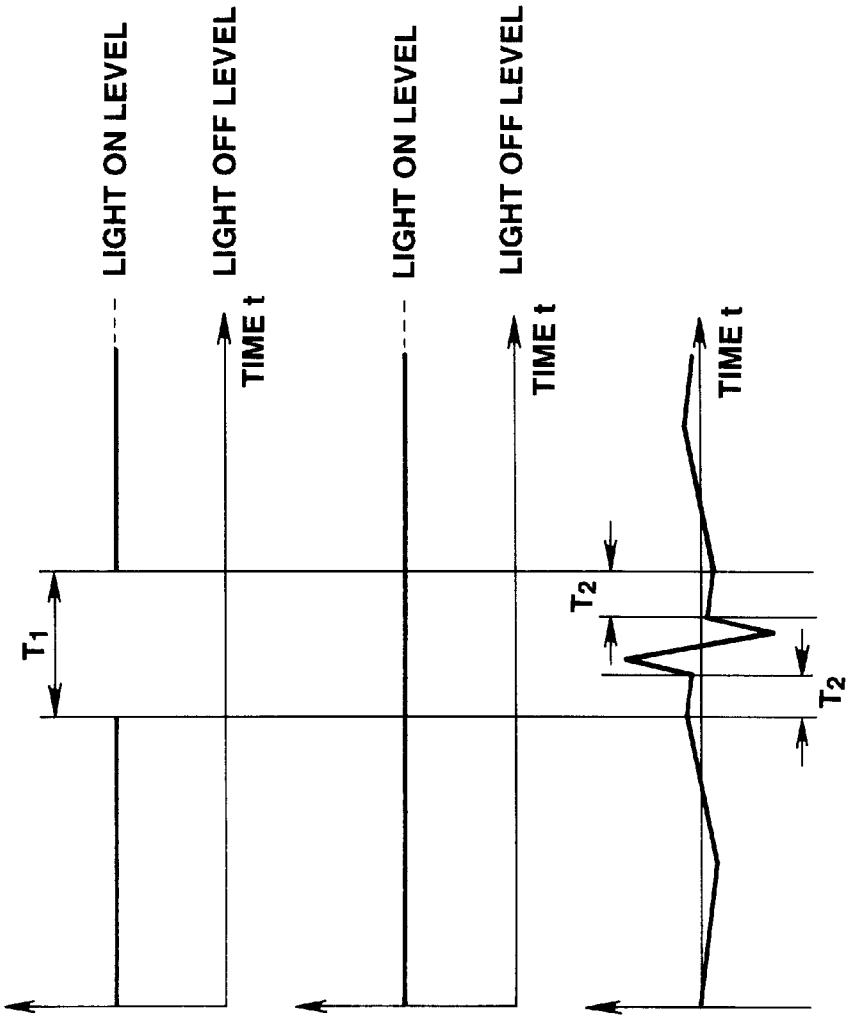

RECORDING MEDIUM MASTER PRODUCTION METHOD AND RECORDING MEDIUM

BACKGROUND OF THE INVENTION

1. Field of the Invention

The present invention relates to a recording medium on which a data signal, an address signal, and the like are recorded by groove side wall wobbling, and a method for producing a recording medium master used for producing such a recording medium.

2. Description of the Prior Art

As shown in FIG. 1 for example, on a surface of an optical disc, a concavo-convex pattern is formed according to a data signal or the like. More specifically, in a signal recording area where a data signal is to be recorded, a groove 100 which is an indentation and a land 101 which is a protrusion are formed on one surface of a disc substrate made from an optically transparent plastic material. The groove 100 is provided in a spiral state with a predetermined track pitch p. Here, the track pitch p is assumed to be approximately 0.7 μm to 1.6 μm. In the optical disk shown in FIG. 1, a recording layer is formed on its surface so as to enable recording and reproduction of a data signal.

For example, in the most of the phase-change type recordable optical discs or the magneto-optical disks, the signal recording area is occupied by the land 101 as a recording area and the groove 100 as the light reflection area for tracking. In these optical discs, a phase-change film or a magnetic film as a recording layer and a light reflection film or the like are formed on a signal recording plane on which the groove 100 or the like is formed.

Moreover, a shown in FIG. 2, in most of the optical discs dedicated for reproduction, a string of pits 102 on a signal recording plane is used as a recording area and a diffraction grating for tracking. It should be noted that a light reflection film and the like are also formed on the signal recording plane.

When carrying out a recording/reproduction to/from an optical disk as has been described above, the optical disc is rotated and a laser beam is applied from a beam source provided in an optical pickup, to a surface opposite to the substrate surface on which the groove and pit are formed.

Here, in the optical disc capable or recording a data signal, data is written by the laser beam in the recording layer on the land 101 and the written data is read out by reflection of the laser beam. In this data signal recording and reproduction, the laser beam for recording or reproduction is controlled by a tracking control so that the laser beam is always applied onto a predetermined track, for example, by detecting a reflected beam from the groove.

On the other hand, in the optical disc dedicated for reproduction, a data reading and tracking control are carried out by applying a laser beam onto the signal recording plane and detecting a diffraction light reflected from the signal recording plane having the string of the pits 102.

Thus, the concavo-convex pattern on the surface of an optical disc determines the performance as a data recording medium. Consequently, when producing an optical disc, it is necessary to produce a disc substrate on which a concavo-convex pattern is formed with a high accuracy.

Description will now be directed to a method for producing such a disc substrate.

For producing a disc substrate, firstly, it is necessary to prepare a glass master substrate whose surfaces are sufficiently polished and washed. On this master substrate, about 0.1 mm thickness of photo-resist is painted which becomes alkali-soluble by exposure to light.

Next, a laser beam is focused via an objective lens onto the surface of the photo-resist. For this, the glass master substrate is rotated and the laser beam is fed in the radius direction by an identical distance for each turn. By this application of the laser beam, a latent image of a groove is formed in the photo-resist at a predetermined interval p in a spiral state. At this time, if the laser beam is applied intermittently, it is possible to generate a latent image of a pit string in the photo-resist for each track pitch.

Next, this glass master substrate is developed with an alkaline developing solution, so as to remove the portions which have been exposed to the laser beam in the aforementioned step. Thus, in a recordable optical disc, a continuous groove is formed in the photo-resist to define a convex land left between the continuous groove in the radius direction of the glass master substrate. In an optical disc dedicated for reproduction, a convex pit string is formed in the photo-resist.

Next, the glass master substrate is plated with Ni so as to prepare a stamper on which the groove or the continuous pit string of the photo-resist is transferred.

Next, the concavo-convex pattern formed on this stamper is transferred to a plastic material of an optical disc substrate by way of injection molding or the like, so as to complete a disc substrate on which the groove and the land or the pit string are formed.

As for the recordable optical disc, when preparing this disc substrate, a recording film and a reflection film are formed on the concave-convex pattern having the groove on the disc substrate. As for the optical disc dedicated for reproduction, a reflection film and a protection film are formed on the concavo-convex pattern having the pit string on the substrate.

For the optical disc provided with such a disc substrate, there are two recording methods: a land recording method in which a data signal is recorded only on the land; and a groove recording method in which a data signal is recorded only in the groove. Furthermore, in order to increase a recording density in future, there has been suggested a land/groove recording method in which the width of the land is formed almost identical to the width of the groove and a signal is recorded both on the land and in the groove.

Moreover, such a disc substrate has not only the groove configuration as a signal recording area but also contains address signals recorded in advance such as a track address signal for accurately recording/reproducing a data signal recorded and a clock generation signal for controlling the disc rotation velocity.

There are two types of methods to record these address signals: emboss forming for recording the address signals and groove side wall wobbling for recording the address signals.

FIG. 3 shows the emboss pit forming method for recording an address signal. An address signal is recorded by emboss pits 102 forming a concavo-convex pattern in a signal recording area. In this emboss pit method using the emboss pits 102 for recording an address signal, a predetermined area is occupied by address signals, where no data signal can be recorded. The address signal area in which the emboss pits 102 are formed for recording the address signals occupies about 20 positions in one round of the disc substrate. Consequently, this decreases the signal recording area, i.e., decreases the data signal recording capacity.

On the other hand, FIG. 4 shows the groove side wall wobbling method for recording an address signal. As shown in the figure, the groove side walls are meandered according to an address signal to be recorded, by wobbling the laser beam spot applied onto the photo-resist formed on the glass master substrate, and this wobbling is detected at reproduction. In this method, in comparison to the aforementioned emboss pit method, the signal recording area is not partially occupied by the address signals, enabling to use the entire signal recording area for recording data signals. Consequently, this method enables to increase a data signal recording capacity.

As has been described above, as means for realizing a high density in the future, it is considered to use the land/groove recording in combination with the address data recording by way of wobbling.

However, in the conventional wobbling method as shown in FIG. 4, the configuration of the land 101 is defined by the meandering configuration of the adjacent groove(s) 100 and it is impossible to assign an inherent address signal.

Here, a one-sided wobbling method has been suggested as shown in FIG. 5, in which one side 100a of a groove 100 is maintained as a straight line and the other side 100b of the groove 100 alone is wobbled for address data recording to be shared by the land 101, wherein the land 101 and the groove 100 are distinguished from each other by some means so that data can be written to all of the tracks.

In order to manufacture a disc substrate of the one-side wobble method, two optical beams are used. That is, when producing a one-side wobbled disc substrate, as shown in FIG. 5, the groove 100 is formed by using a straight-going spot 103 (hereinafter, referred to as a straight spot) and a wobblingly advancing spot 104 (hereinafter, referred to as a wobbling spot). The groove 100 formed by exposure to these spots is formed in such a manner that the groove 100 has an identical width as the land 101. In this process, one of the optical beam causes a wobbling spot so as to form the groove 100, thus enabling to obtain a one-side wobbled disc substrate. It should be noted that each of the straight spot 103 and the wobbling spot 104 for forming the one-side wobbled groove 100 normally has a diameter in the order of approximately 0.5 $\mu$m. Moreover, the groove 100 and the land 101 respectively has a width in the order of about 0.6 $\mu$m.

Furthermore, as shown in FIG. 6, for this one-side wobbled disc substrate, it has been suggested to record by wobbling a fine clock mark 105 which is a synchronization mark for a recording clock for controlling the disc rotation count, enabling to set a head of a data signal. This fine clock mark 105, similarly as has been described above, is formed by one of the two optical beams. That is, when forming this fine clock mark 105, the wobbling spot 104 is wobbled with a greater amplitude while directly advancing the straight spot 103.

As has been described above, the one-side wobbling method for recording an address signal and a fine clock mark 105 is significantly effective in a disc-shaped recording medium such as an optical disc having a high recording density. However, currently there is a problem when creating a latent image of the groove 100 and the land 101 on the photo-resist by applying the laser beam.

The fine clock mark 105 is a signal for setting a head of a signal recording. Consequently, in an area where this fine clock mark 105 is recorded, it is assumed that no data signal is to be recorded. Accordingly, it is preferable that the area occupied by the fine clock mark 105 be small. Therefore, this fine clock mark 105 is preferably recorded by a single creation for one recording unit and it is not preferable to sequentially use several pulses.

As a result, unlike an address signal including an error correction information created by ordinary wobbling, it is not allowed to cause an error in detecting the fine clock mark 105 and accordingly, it is necessary to enhance the detection sensitivity by increasing the wobble amplitude into several times of the ordinary amplitude.

Here, while the ordinary wobble signal has an amplitude $t_6$ of $\pm 0.05$ $\mu$m, the fine clock mark 105 should have an amplitude $t_7$ in the order of $\pm 0.1$ to $0.2$ $\mu$m.

When the wobble amplitude of the fine clock mark 105 is increased, as shown in FIG. 7, creation of the fine clock mark 105 may leave an unexposed portion 106 between the two spots, i.e., when the wobbling spot 104 departs far from the straight spot 103, or may cause a protruding portion 107 protruding from the side wall of the groove 100 formed by the straight spot 103 when the wobbling spot 104 approaches the straight spot 103.

Moreover, there is a more serious problem that if the amplitude $t_7$ of the wobbling spot 104 is increased for enhancing the detection sensitivity as shown in FIG. 7 when forming the fine clock mark 105, the groove formed by the wobbling spot 104 is overlapped with the groove formed by the straight spot 103. That is, when the fine clock mark 105 is formed, the groove exposed by the wobbling spot 104 may be partially destroyed by the groove formed by the straight spot 103 such as a portion 108 in the figure, which in turn disables to obtain the amplitude $t_7$ of the fine clock mark 105. Moreover, the amplitude of the fine clock mark 105 becomes asymmetric at the right and the left, which causes distortion in a reproduced waveform and it becomes difficult to detect a zero cross point.

This problem becomes more serious when the data signal recording density is to be increased by reducing the width of the groove formed by the two optical beams and reducing the distance between the two spots in the radius direction.

To cope with this, there can be considered a method that the wobbling spot 104 which forms the fine clock mark 105 is wobbled so as to increase the amplitude of the fine clock mark 105 only in a direction opposite to the straight spot 103. However, in order to obtain a reproduction signal amplitude of the desired fine clock mark 105, the wobbling amplitude should be doubled in comparison to the aforementioned method if the amplitude of the fine clock mark 105 is to be given only in the direction opposite to the straight spot 103. The doubling of the amplitude of the fine clock mark 105 may not be obtained by the optical polarization element provided in the optical system of a cutting apparatus.

SUMMARY OF THE INVENTION

It is therefore an object of the present invention to provide a recording medium in which a fine clock mark formed by a wobbling spot will not be destroyed by a straight spot and an amplitude of a reproduction signal by the fine clock mark is increased so as to enhance a recording capacity of the recording medium. It is another object of the present invention to provide a production method for producing a recording medium master used for producing such a recording medium.

In order to achieve the aforementioned object, the recording medium master production method according to the present invention includes: a step for forming a photo-sensitive layer on a substrate; an exposure step for carrying out exposure to a predetermined area of the photo-sensitive layer so as to form at least a groove; a developing step for developing the photo-sensitive layer which has been exposed in the exposure step; and a master forming step for forming a recording medium master on the photo-sensitive layer which has been developed in the developing step; wherein the exposure step is characterized in that exposure of an area, other than an area where a synchronous signal is to be recorded, is carried out by a first beam which forms one of the walls of the groove and a second beam which is wobbled at least according to an address signal to form the other wall of the groove; and exposure of the area where the synchronous signal is to be recorded is carried out only by the second beam which is wobbled according to the synchronous signal.

It is preferable that the exposure step be carried out in such a manner that the area where the synchronous signal is to be recorded is subjected to exposure for a total time of t wherein 0 μsec<t<0.5 μsec added before and after the time for forming the synchronous signal.

In the aforementioned recording medium master production method, in the exposure step for exposing a predetermined area of the aforementioned photo-sensitive layer for forming at least a groove: when exposing an area other than the area where a synchronous signal is to be recorded, a first beam is applied for exposure to form one of the walls of the groove and a second beam is applied for exposure to form the other wall while being wobbled according to at least an address signal; and when exposing the area where the synchronous signal is to be recorded, only the second beam is used for exposure to form the groove while being wobbled according to the synchronous signal. Consequently, the groove formed by the first beam will not overlap with the groove formed by the second beam. Therefore, according to this recording medium master production method, it is possible to record a synchronous signal by the second beam without being distorted by the first beam.

Moreover, the recording medium according to the present invention has at least a groove formed on a recording plane including: an area having no synchronous signal recorded where one of the walls of the groove is formed straight and the other wall of the groove is at least partially meandered according to an address signal; and an area having a synchronous signal recorded where both of the walls of the groove are meandered according to the synchronous signal.

In such a recording medium an area containing a synchronous signal recorded, both of the walls of the groove are meandered according to the synchronous signal, enabling to accurately detect the synchronous signal.

BRIEF DESCRIPTION OF THE DRAWINGS

FIG. 19, consisting of FIGS. 19A through 19C, shows a Ch-A recording signal to be supplied to an acoustic-optical modulator Ch-A, a Ch-B recording signal to be supplied to an acoustic-optical modulator Ch-B, and a wobbling signal to be supplied to AOD in relation to time.

DETAILED DESCRIPTION OF THE PREFERRED EMBODIMENTS

Description will now be directed to a recording medium master production method and a recording medium according to the present invention with reference to the attached drawings.

Figure 1:
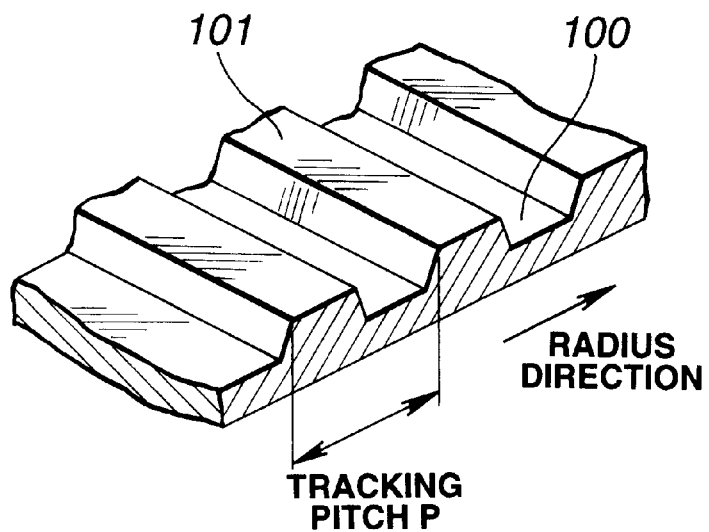
FIG. 1 is a perspective view showing a cross-sectional configuration of an essential portion of a conventional optical disc capable of recording and reproduction.
Figure 2:
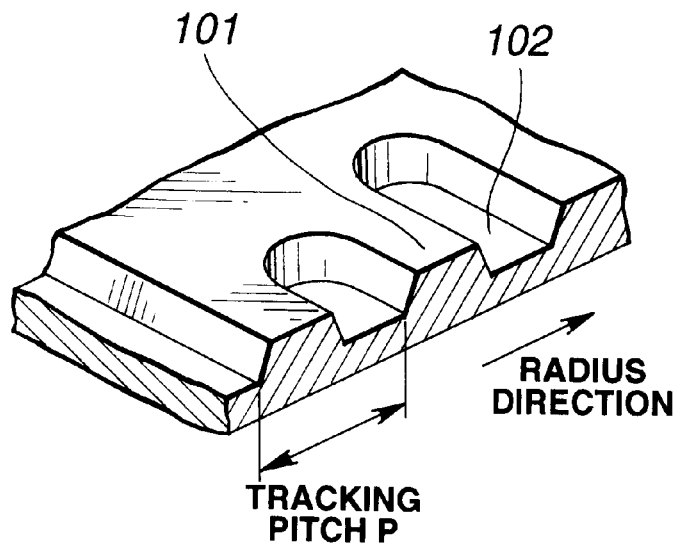
FIG. 2 is perspective view showing a cross-sectional configuration of an essential portion of a conventional optical disc dedicated for reproduction.
Figure 3:
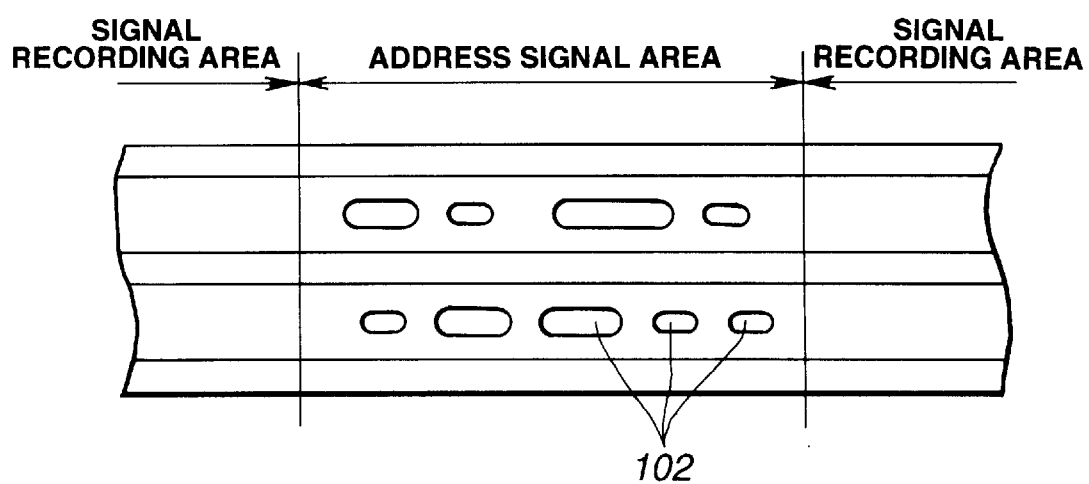
FIG. 3 is an enlarged plan view of an essential portion of an optical disk on which an address signal is recorded by way of emboss pits.
Figure 4:
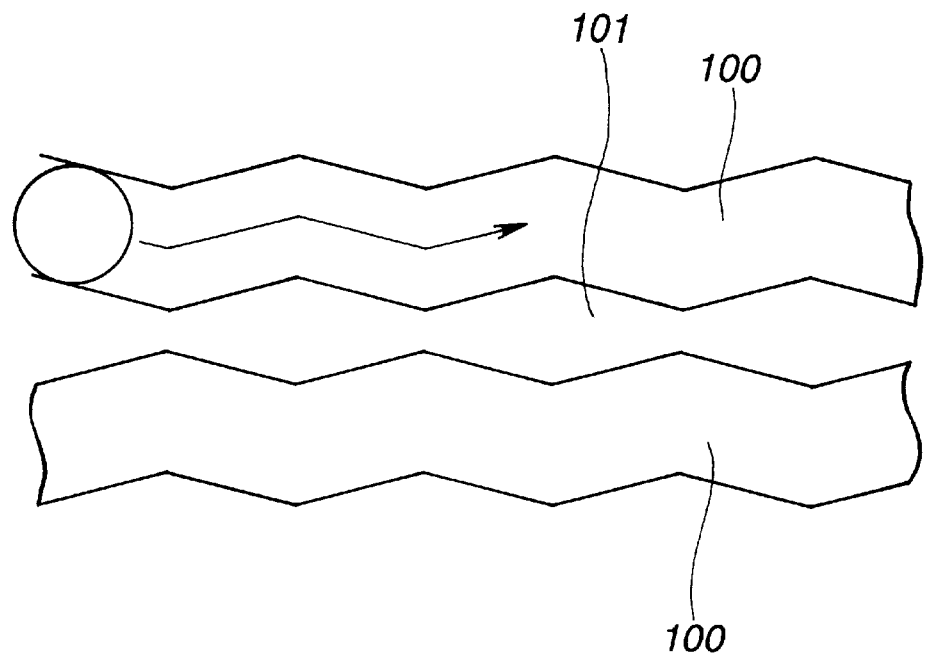
FIG. 4 is an enlarged plan view of an essential portion of an optical disc on which an address signal is recorded by wobbling both sides of a groove.
Figure 5:
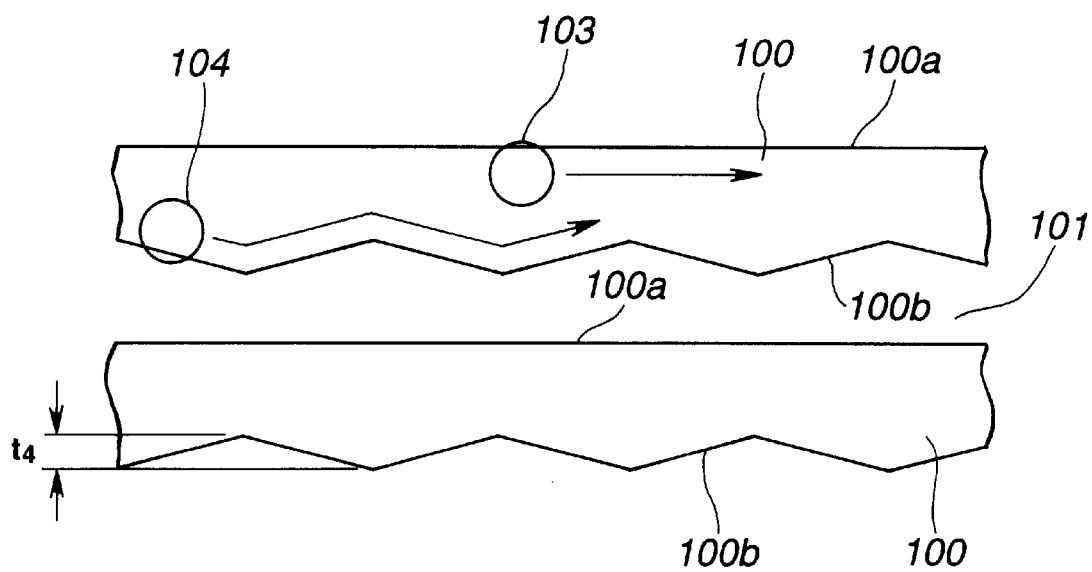
FIG. 5 is an enlarged plan view of an essential portion of an optical disc on which an address signal is recorded by the one-side wobbling method in the land/groove recording.
Figure 6:
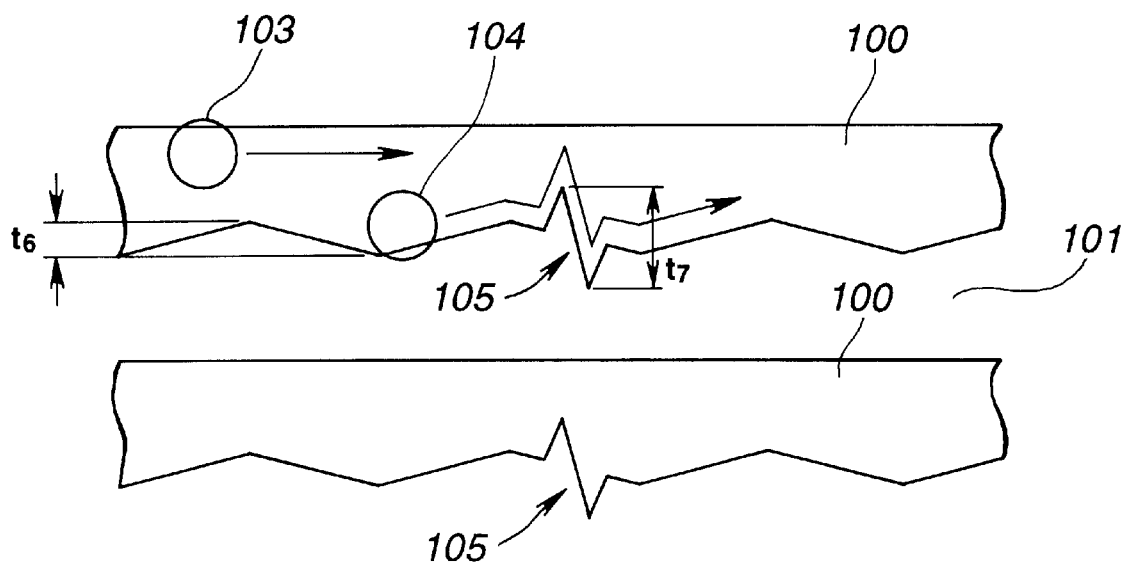
FIG. 6 is an enlarged plan view of an essential portion of an optical disc on which an address signal is recorded by the one-side wobble method and a fine clock mark is recorded.
Figure 7:
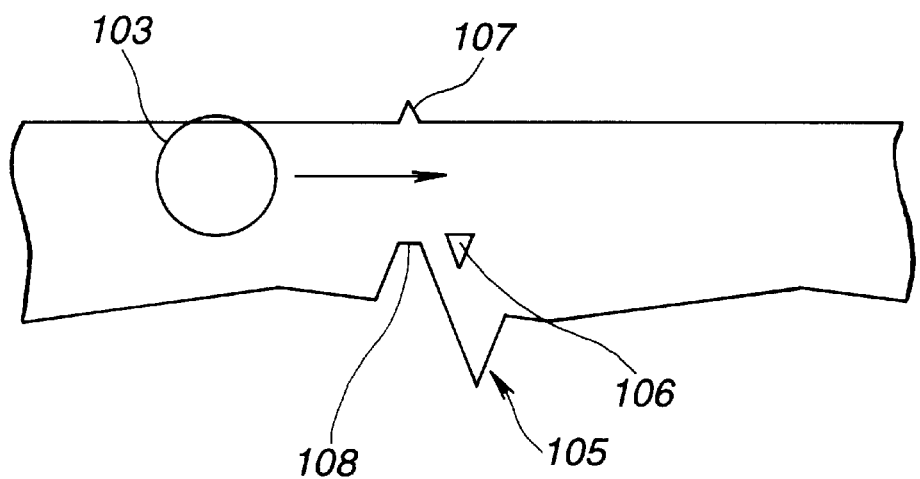
FIG. 7 shows an optical disc containing an address signal recorded by the one-side wobbling method and a fine clock mark having an amplitude which is partially destroyed and partially protrudes from a side wall.
Figure 8:
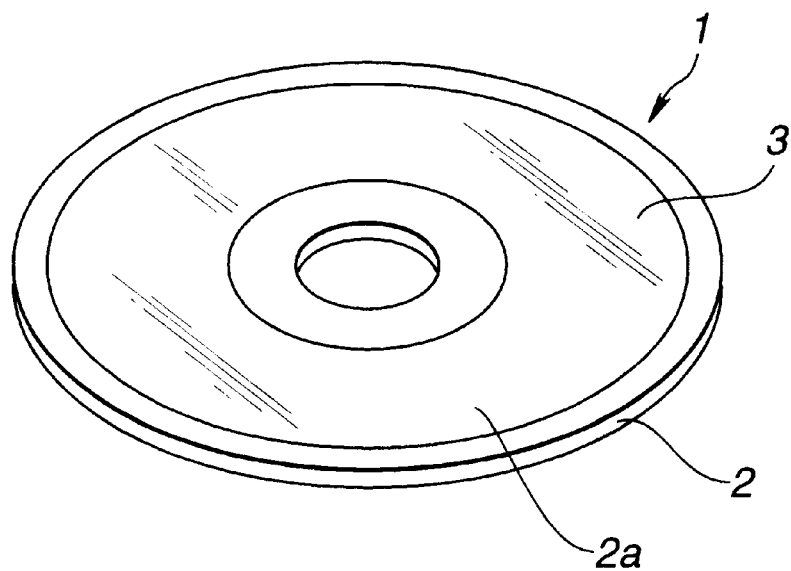
FIG. 8 shows an example of an optical disc.

The recording medium according to the present invention, as shown in FIG. 8 for example, can be employed for an optical disc 1 having a function layer formed on its surface so that a data signal can be recorded. The optical disc 1 according to the present invention is made from a plastic material or the like having at least a disc substrate 2 having at least one surface on which a convex groove and a concave land are formed, and a function layer 3.

Figure 9:
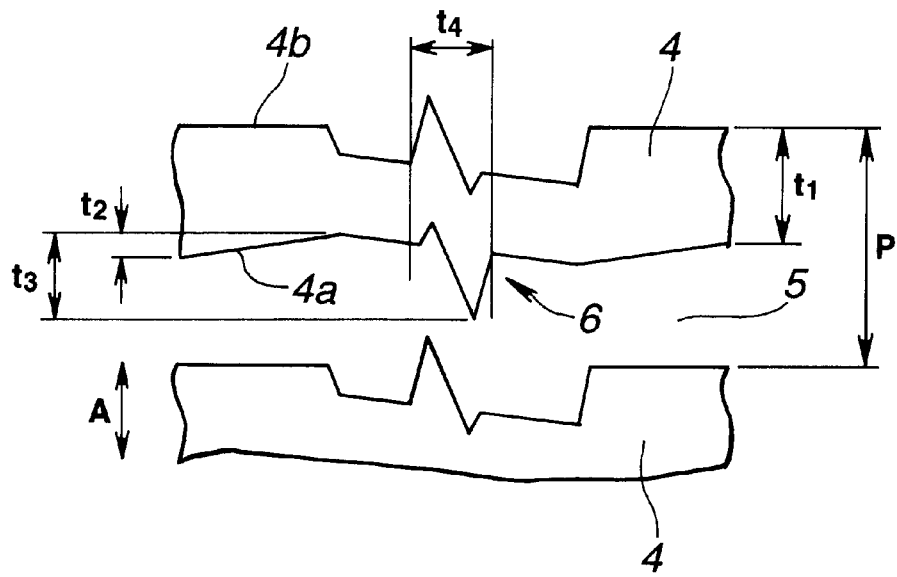
FIG. 9 is an enlarged plan view of an essential portion of an optical disc according to an embodiment of the present invention.

As shown in FIG. 9, the disc substrate has a recording surface 2a on which a data signal and the like are to be recorded. On this recording surface 2a are formed a groove 4 formed as a convex configuration and a land 5 as a concave configuration. The land 5 and the groove 4 are formed in a spiral shape with a predetermined track pitch p. The track pitch p is in the order of approximately 0.7 to 1.6 μm.

Moreover, the groove 4 and the land 5 are formed approximately with an identical length in the radius direction A of the optical disc 1. A data signal is recorded on this land 4 and the groove 5. It should be noted that in the optical disc 1 according to the present invention, the groove 4 is formed so as to have a length $t_1$ in the radius direction A in the order of approximately 0.6 μm.

Moreover, the groove 4 has a first wall 4a which is meandered and a second wall 4b which is straight. Thus, an address signal is recorded in the groove 4 by the meandered first wall 4a. Here, the address signal is an auxiliary signal for accurately recording/reproducing a data signal, including a track address signal. It should be noted that in the optical disc 1 according to the present invention, the first wall 4a is formed so as to have an amplitude $t_2$ in the order of approximately ±30 nm.

The optical disc 1 contains a fine clock mark 6 recorded for creating a clock for controlling a disc rotation count as an address information. This fine clock mark 6 is formed by meandering of the first wall 4a and the second wall 4b. This fine clock mark 6 recorded with a greater amplitude than an amplitude $t_2$ of the meander formed on the first wall 4a where another address signal is recorded. It should be noted that the amplitude $t_3$ of the area containing this fine clock mark 6 recorded is in the order of approximately 50 to 100 nm. Moreover, the area containing the fine clock mark 6 has a length $t_4$ in the track direction in the order of approximately 2 to 10 μm. It should be noted that in the area containing this fine clock mark 6, distortion of a reproduction signal is caused and no data signal is recorded.

Moreover, the function layer 3 is formed on the disc substrate 2 for recording/reproducing a data signal. This function layer 3 is made from a phase-change type material if the optical disc is to be a phase-change type or a magneto-optical material if the optical disc is to be a magneto-optical type.

In the optical disc having the aforementioned configuration, wobbling is carried out only for the first wall 4a of the groove 4 in the area not containing the fine clock mark 6, and wobbling is carried out for both of the first wall 4a and the second wall 4b of the groove 4 in the area where the fine clock mark 6 is recorded. Consequently, even with an amplitude identical to the conventional fine clock mark, it is possible to increase an amplitude of a reproduction signal with respect to the fine clock mark 6. Therefore, in this optical disc 1, it is possible to reduce the amplitude of the fine clock mark 6 so as to cope with a narrow track pitch which is expected in the future. Moreover, in this optical disc 1, it is possible to increase a reproduction output of the fine clock mark 6 and accordingly, to reduce the area t4 where the fine clock mark 6 is recorded, thus enabling to expand the data signal recording area which in turn increases the recording capacity.

Description will now be directed to a production method of such a recording medium master according to an embodiment of the present invention.

The disc master production method which is be detailed below includes: a photo-resist layer forming step for forming a photo-resist layer on a glass substrate made from a glass material; an exposure step for applying an optical beam to this photo-resist layer; a developing step for developing the photo-resist layer which has been exposed to the optical beam; and a coating step for forming a coating on the photo-resist layer.

Figure 10:
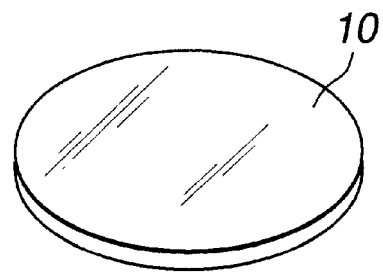
FIG. 10 shows an example of a glass substrate.
Figure 11:
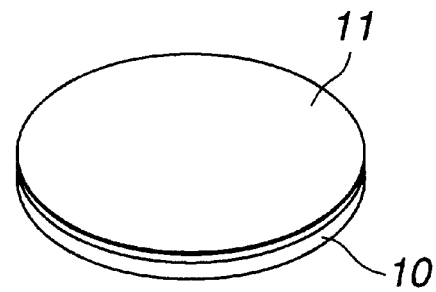
FIG. 11 shows an example of a glass substrate on which a photo-resist layer is formed.

Firstly, as shown in FIG. 10, a glass substrate 10 is prepared by sufficiently polishing and cleaning its surfaces. Next, as shown in FIG. 11, this glass substrate 10 is painted with a photo-resist layer 11 of thickness in the order of 0.1 μm which becomes an alkaline soluble material when subjected to an exposure processing.

Figure 12:
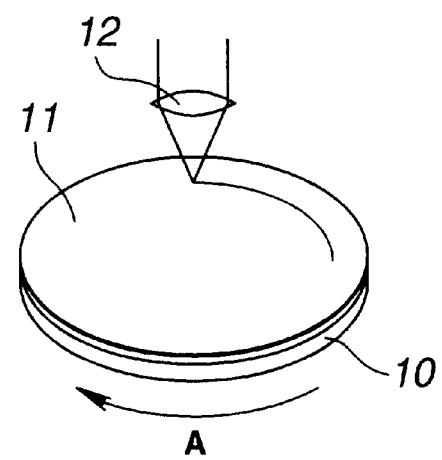
FIG. 12 shows an optical beam applied to create a latent image of a groove in the photo-resist layer.

Next, in the exposure step, as shown in FIG. 12, an optical beam is focused via an objective lens 12 onto a surface of the photo-resist layer 11. For this exposure, the glass substrate 10 is rotated in the circumferential direction A while the optical beam is fed in a radius direction with an identical distance per one rotation. Thus, by applying the optical beam, a latent image of a groove 4 is formed in the photo-resist layer 11 in a spiral state with a constant track pitch p. In this process, by applying the optical beam intermittently, it is possible to create in the photo-resist layer a latent image of a land and a groove for each of the track pitch p in a spiral state. This exposure step will further detailed later.

Figure 13:
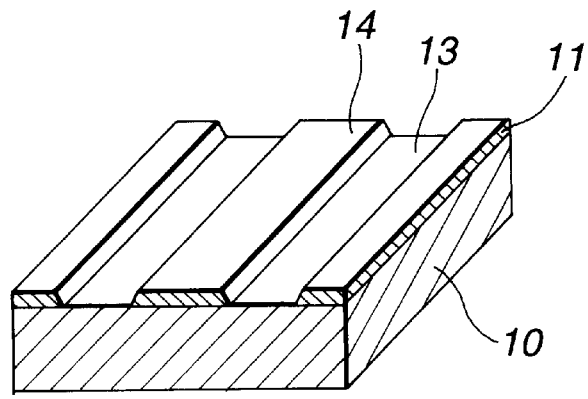
FIG. 13 shows, as an example, a state of a groove and land formed on the glass substrate.

Next, in the development step, as shown in FIG. 13, the glass substrate 10 is developed with an alkaline developing solution so as to remove the portion which has been exposed to the optical beam in the aforementioned step. With this, in a recordable optical disc, a groove 13 is formed as a continuous groove in the photo-resist layer 11 alternating with a land 14 left as a convex portion in the radius direction of the glass substrate 10.

Figure 14:
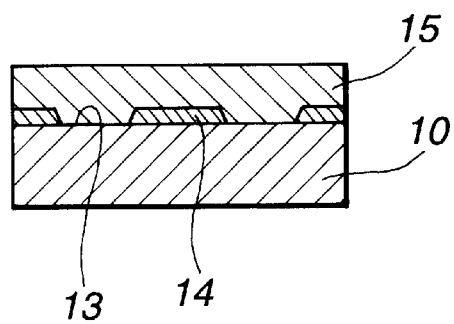
FIG. 14 is a cross-sectional view showing, as an example, the glass substrate plated.

Next, in the coating step, as shown in FIG. 14, the glass substrate 10 is coated with Ni so as to obtain a disc master 15 onto which the groove 13 and the land 14 are transferred. In order to produce a disc substrate, the disc master thus prepared is used to transfer the concavo-convex pattern onto a synthetic resin material or the like.

Figure 15:
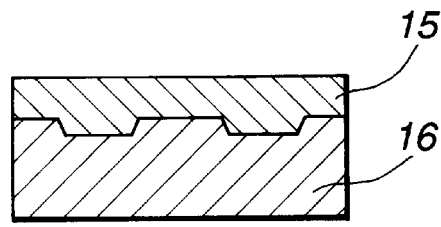
FIG. 15 is a cross-sectional view showing a concavo-convex pattern transferred by a stamper to a plastic material.

As shown in FIG. 15, the disc master 15 thus produced is used to transfer the concavo-convex pattern by way of injection molding or the like onto a plastic material 16 which is the material of an optical disc, thus completing a disc substrate on which the groove and the land are formed.

In the aforementioned exposure step, a laser cutting apparatus is used for applying an optical beam to the photo-resist layer 11 so as to create a latent image of the concavo-convex pattern. Description will now be directed to a laser cutting apparatus used in the disc substrate production method according to the present invention.

Here, for example, in a phase-change type disc substrate or in a magneto-optical disc substrate, other than the groove configuration for a signal recording area, it is necessary to provide an address signal or the like in advance which will serve as a position reference when recording a data signal. As will be described below, it becomes necessary to carry out exposure of an address signal pit by using a laser spot other than the spot used for creation of the groove or to vibrate the spot in the radius direction of the glass substrate so as to expose a meandered groove.

Figure 16:
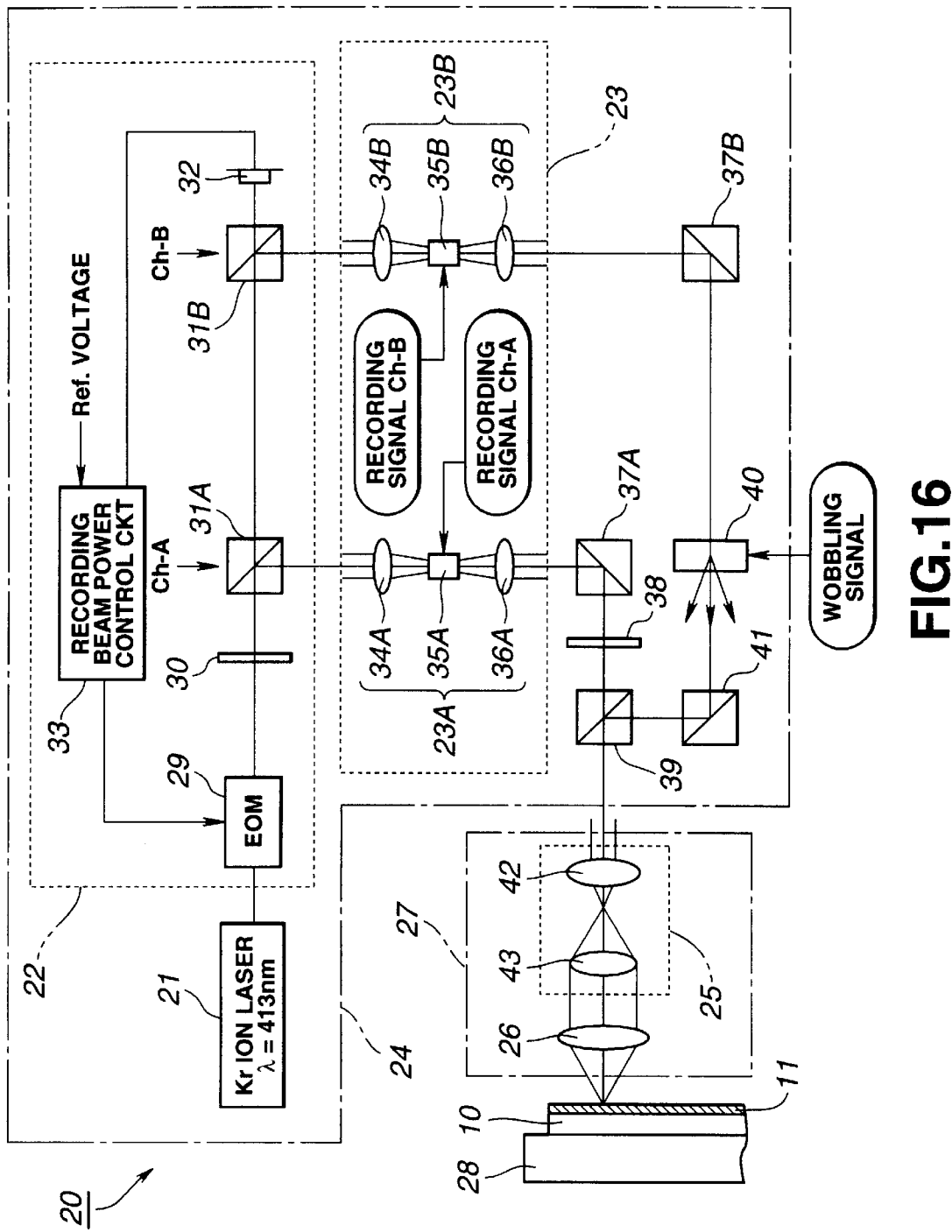
FIG. 16 shows an example of an optical system of a laser cutting apparatus used in the exposure step in the disc substrate producing method according to the present invention.

This laser cutting apparatus 20, as shown in FIG. 16, is provided with two beam optical systems: a Ch-A optical system corresponding to spot wobbling and a Ch-B optical system. In this laser cutting apparatus 20, a beam polarization element is inserted into the Ch-B optical system, enabling to wobble the spot. That is, this laser cutting apparatus 20 is provided with the Ch-B optical system which carries out exposure while wobbling the laser spot and the Ch-A optical system which carries out exposure without wobbling the laser spot. By using the optical systems of this laser cutting apparatus 20, for example, it is possible to create a format of a groove with one wall wobbled.

This laser cutting apparatus 20, as shown in FIG. 16, includes: a light source 21 for emitting light, a recording light intensity control block 22, and a modulation block 23, which constitute a fixed block; a beam expander block 25 and an objective lens 26 which constitute a movable block 27; and a rotatable turn table 28 on which the glass substrate 10 coated with the photo-resist layer 11 is placed.

The light source 21, for example, employs Kr ion laser for emitting a beam having a wavelength of approximately 413 nm.

The recording light intensity control block 22 eliminates instability of the beam applied to the glass substrate 10. The beam emitted from the light source 21 is introduced to this recording light intensity control block 22 which includes: an electro-optic modulator (EOM) 29 which uses an electro-optical crystal element for making the beam have a polarization plane of an arbitrary angle; an analyzer 30 to which the beam from the EOM 29 is introduced and which passes only light having a polarization plane of a predetermined angle; beam splitters 31A and 31B which pass only half of the light quantity from the analyzer 30 and reflects the remaining half to a modulation block 23 which will be detailed later; a photo diode 32 for detecting the light which has passed the beam splitters 31A and 31B; and a recording light intensity control circuit 33 which is supplied with a signal from this photo diode 32 and a reference voltage so as to control the light intensity to be applied to the glass substrate 10. That is, this recording light intensity control block 22 changes the light polarization plane by the EOM 29 so as to change the light quantity which passes the analyzer 30, so as to control the light intensity applied to the glass substrate 10. It should be noted that this recording light intensity control block 22 is provided with the beam splitter 31A and the beam splitter 31B which correspond to the Ch-A and Ch-B, respectively.

In the modulation block 23, in order to form a pit having a length corresponding to an electric recording signal, the voltage level of a recording signal supplied is changed into a light intensity. Moreover, this modulation block 23 consists of modulation sub blocks 23A and 23B corresponding to a Ch-A optical system and a Ch-B optical system. For example, if the recording voltage signal level is a binary value consisting of 0 and 1, this modulation block 23 modulates the light ON and OFF so that the recording signal level is changed into a light intensity. This modulation block 23 includes: first concave lenses 34A and 34B into which comes the light reflected from the beam splitters 31A and 31B provided in the recording light intensity control block 22; acoustic-optical modulators 35A and 35B for modulating the light from the first concave lenses 34A and 34B according to a signal recording level supplied; and second concave lenses 36A and 36B into which comes the light modulated by the acoustic-optical modulators 35A and 35B. It should be noted that the acoustic-optical modulators 35A and 35B are supplied with a recording signal and convert this recording signal voltage level into a light intensity, The light which has passed through this modulation block 23 is introduced into the Ch-A optical system and Ch-B optical system. In the Ch-A optical system, the light is introduced to a beam splitter 37A, and then via a half-wave plate 38 and a polarization beam splitter (hereinafter, referred to as a PBS) 39 to a beam expander block 25. In the Ch-B optical system, the light is introduced to a beam splitter 37B, and then via an acousto-optic deflector (AOD) 40 and a beam splitter 41 to the PBS 39.

The beam expander block 25 adjusts a beam spot diameter applied to the glass substrate 10. This beam expander block 25 changes the magnification ratio for adjusting the beam spot diameter focused on the glass substrate 10. This beam expander block 25 includes a third concave lens 42 into which comes the light from the beam splitter 39 and a fourth concave lens 43 to which comes the light which has passed the third concave lens 42. Moreover, in this beam expander block 25, the magnification ratio of the spot diameter can be expressed as $f_4/f_3$ wherein $f_3$ is a focal distance of the third concave lens 42 and $f_4$ is a focal distance of the fourth concave lens 43.

The light which has passed the beam expander block 25 is introduced into the objective lens 26 and is focused with a predetermined spot diameter on the glass substrate 10 coated with the photo-resist layer 11. Note that this objective lens 26 has NA of approximately 0.9.

The turn table 28 holds the glass substrate 10 coated with the photo-resist layer 11 and rotates the glass substrate 10 in a predetermined rotation direction A by predetermined rotation count.

Here, the movable block 27 is moved by a moving mechanism (not depicted) so that the objective lens 26 is moved in a direction vertical to a tangent direction of the rotation of the glass substrate 10. Thus, the objective lens 26 is moved in the vertical direction to the tangent direction of the rotation of the glass substrate 10 for creating the concavo-convex pattern on the entire surface of the glass substrate 10.

Moreover, this objective lens 26 is maintained by a servo system at a constant distance from the exposure surface of the glass substrate 10. This servo system is provided with a focusing light source for emitting a light having a wavelength for which the photo-resist layer 11 is not sensitive. This servo system focuses a beam from the focusing light source onto the glass substrate 10 and detects a light reflected from this glass substrate 10, so as to control the spot diameter of the beam from the light source 21 to be constant.

The laser cutting apparatus 20 having the aforementioned configuration rotates the glass substrate 10 and moves the beam in the radius direction of the glass substrate 10 with an identical distance for each turn of the glass substrate 10, so that a latent image of a groove can be created in a spiral state with a constant track pitch p, In the laser cutting apparatus 20 having the aforementioned configuration, firstly, a beam emitted from the light source 21 emits passes through the EOB 29 and reaches the Ch-A beam splitter 31A, where only about 50% of the beam passes through the Ch-A beam splitter, so that the light quantity supplied to the Ch-A optical system is almost identical to the light quantity supplied to the Ch-B optical system. It is also possible to select a transmittance of the beam splitter 31A according to the light quantity required at the respective channels.

Next, the beam which has passed the beam splitters 31A and 31B is introduced into the modulation block 23. Here, the Ch-A optical system is completely identical to the Ch-B optical system in the modulation block 23. It should be noted that by using separate modulators 23A and 23B for the respective channels, it is possible to record different signals which are completely independent from each other. That is, in this laser cutting apparatus 20, it is possible to simultaneously carry out exposure of a groove by the Ch-A optical system and exposure of pits by the Ch-B optical system. Note that in the laser cutting apparatus 20 used in the exposure step of the disc master producing method according to the present invention, the second wall 4b is created by the beam which has passed through the Ch-A optical system and the first wall 4a is created by the beam which has passed through the Ch-B optical system.

Here, in this laser cutting apparatus 20, the respective channels are provided with an acoustic-optical modulator 35A which is supplied with a Ch-A recording signal and an acoustic-optical modulator 35B which is supplied with a Ch-B recording signal. The Ch-A recording signal and the Ch-B recording signal, when supplied to the Ch-A acoustic-optical modulator 35A and to the Ch-B acoustic-optical modulator 35B, control ON and OFF of the Ch-A acoustic-optical modulator 35A and the Ch-B acoustic-optical modulator 35B, respectively.

Figure 17:
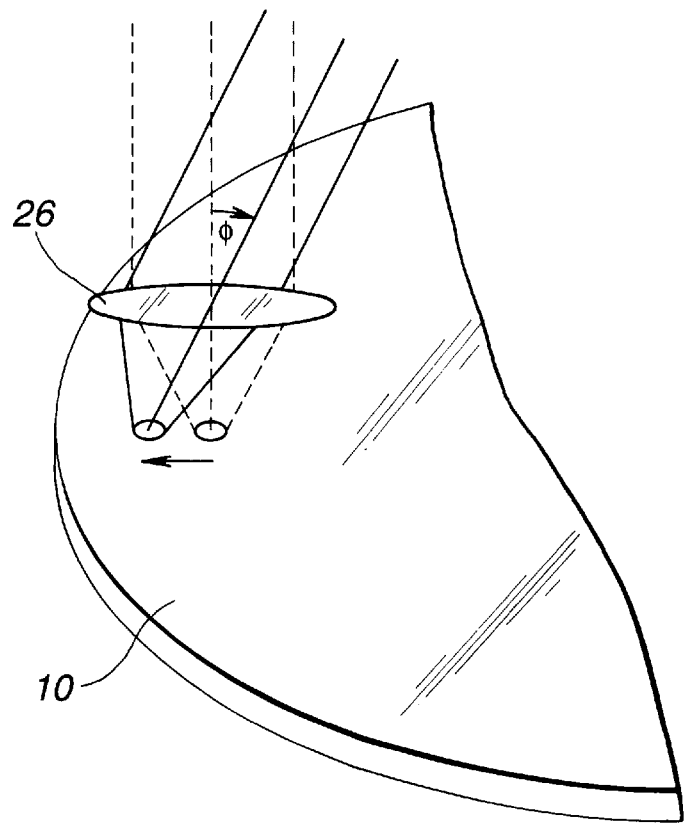
FIG. 17 shows a beam focus spot which is wobbled on the glass master.

After this, the beam which has passed through the Ch-B modulator 23B is passed through a light polarization element such as AOD 51 for example, so as to vibrate the optical axis according to a wobbling signal supplied to the AOD 40. This wobbling signal when supplied to the AOD 40, controls the amplitude of wobbling of a wall of the groove 4 with a voltage value and gives an amplitude to the wall of the groove 4 with a predetermined frequency. Thus, as shown in FIG. 17, the beam spot on the glass substrate 10 is vibrated so as to create wobbling. Here, the laser spot wobbling direction is a radius direction of the glass substrate 10 according to the current format and accordingly, the light polarization element is provided so as to vibrate the spot in the radius direction of the glass substrate 10. After this, the beam which has passed the AOD 40 passes through the beam splitter 41 and is introduced to the polarization beam splitter (PBS) 39.

On the other hand, the beam which has passed through the Ch-A modulator 23A is firstly introduced to the beam splitter 37A. The beam which has passed through this beam splitter 37A is introduced via the half-wave plate 38 to the PBS 39.

The beam which is wobbled by the Ch-B optical system joins the beam which has passed through the Ch-A optical in the PBS 39 prior to the beam expander 25.

Here, as the beam emitted from the light source 21 is straight-line polarized, the beams introduced to the PBS 39 are also straight-line polarized of an identical direction. In this state, the half-wave plate 38 is provided between the beam splitter 37A and the PBS 39, so as to rotate the beam polarization plane by 90 degrees, and in order to make the maximum use of the light quantity which has passed the respective channels, the PBS 39 transmits 100% of the beam which has passed through the Ch-A optical system and reflects 100% of the beam which has passed through the Ch-B optical system.

It should be noted that in the laser cutting apparatus shown in FIG. 16, 100% of the beam which has passed through the Ch-B optical system is reflected, whereas 100% of the beam which has been rotated in its polarization direction by 90 degrees by the half-wave plate 38 and passed through the Ch-A optical system is made to transmit. Normally, the half-wave plate 38 is an element for rotating the straight-line polarization direction by $2\theta$ wherein $\theta$ represents a angle defined by the polarization direction and a crystal axis direction within the plane of the half-wave plate. Consequently, it is possible to determine the polarization rotation angle at a desired value, thereby adjusting the transmittance of the PBS 39 from 0% to 100%. That is, the final adjustment of the light quantity ratio of the beam which has passed through the Ch-A optical system and the beam which has passed through the Ch-B optical system can be carried out by using the characteristic of the aforementioned half-wave plate 38.

After the beams from the both channels join in the PBS 39, the beams pass through the beam expander block 25 and are focused by the objective lens 26 on the glass substrate 10 so as to form the respective spots. The spots thus focused on the glass substrate 10 are focused at a very small distance (normally, within ½ of the track pitch p=1 $\mu$m at maximum) in the radius direction of the glass substrate 10. The distance between the two spots is adjusted by giving an appropriate "gate angle" to the PBS 39, i.e., the reflection angle in the PBS 39 is inclined in the radius direction by necessary degrees from the state when the color axes of the both channels completely coincide after the beam from the Ch-A optical system has joined the beam from the Ch-B optical system. The principle of shifting the spots on the glass substrate 10 by this angle is completely same as when wobbling the spot shown in FIG. 17.

Here, in FIG. 17, a beam having an optical axis indicated by a dotted line is wobbled to have an optical axis indicated by a solid line with an inclination angle $\phi$, thus wobbling the spot focused on the glass substrate 10.

When creating a concavo-convex pattern by using such a laser cutting apparatus 20, in the aforementioned exposure step, a latent image of a groove is created in the photo-resist layer 11 formed on the glass substrate 10 by using two spots formed by the beam passing through the Ch-A optical system and the beam passing through the Ch-B optical system.

Figure 18:
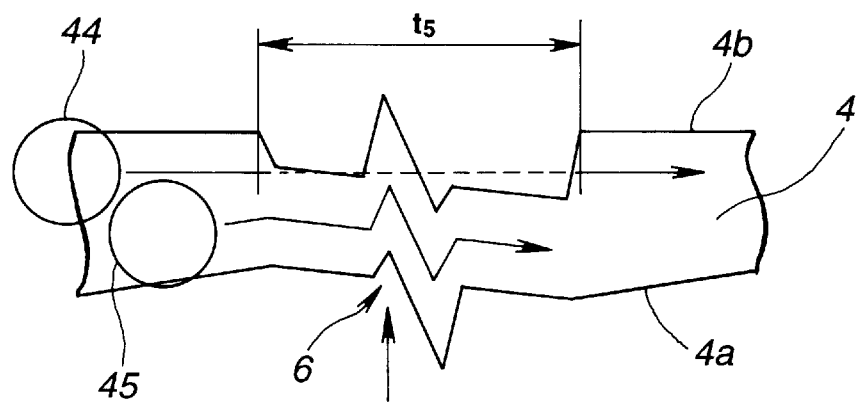
FIG. 18 shows an example of a state when a fine clock mark is formed by the disc substrate production method according to the present invention.

Here, as shown in FIG. 18, a spot 44 of Ch-A is used to form the second wall 4b and a spot 45 of Ch-B is used to form the first wall 4a of the groove 4 formed on the aforementioned disc substrate.

Here, when carrying out exposure of an area excluding an area where the fine clock mark 6 is to be recorded, the spot of the Ch-A channel going straight on the glass substrate (hereinafter, referred to as a straight spot) 44 forms the second wall 4b of the groove 4. Moreover, the spot of the Ch-B optical system which is wobbled on the glass substrate (hereinafter, referred to as a wobbling spot) 45 forms the first wall 4a of the groove 4 while wobbling to record an address signal or the like.

In this process, as shown in FIG. 19A, the Ch-A acoustic-optical modulator 35A is supplied with a Ch-A recording signal which is a signal of the light ON level. Moreover, as shown in FIG. 19B, the Ch-B acoustic-optical modulator 35B is supplied with a Ch-B recording signal which is a signal of the light ON level similarly as the Ch-A recording signal. Furthermore, as shown in FIG. 19C, the AOD 40 is supplied with a wobbling signal so as to wobble the spot formed by the beam which has passed through the Ch-B optical system with a wobbling amplitude of the first wall 4a in the order of approximately ±30 nm in the radius direction of the glass substrate 10.

Thus, by using the Ch-A recording signal and the Ch-B recording signal which are signals of the light ON level and the wobbling signal which wobbles the Ch-B spot so as to have an amplitude of ±30 nm, it is possible to form a latent image of the groove 4 formed to have the first wall 4a wobbled and the second wall 4b straight in the photo-resist layer 1.

On the other hand, when carrying out exposure of the area where the fine clock mark 6 is to be recorded, as shown in FIG. 19A, the straight spot 44 is maintained OFF for the period of time $T_1$ so as not to form the second wall 4b of the grove 4. Moreover, the wobbling spot 45 forms the first wall 4a of the groove 4 by forming the fine clock mark 6 within a predetermined time while wobbling to record an address signal and the like.

In this process, the Ch-A acoustic-optical modulator 35A is supplied with the Ch-A recording signal which is a signal of the light OFF level. The Ch-B acoustic-optical modulator 35B is supplied with the Ch-B signal which is a signal of the light ON level. The AOD 40 is supplied with the wobbling signal which wobbles the wobbling spot 45 so as to obtain an amplitude of the first wall 4a in the order of approximately ±50 to 100 nm in the radius direction of the glass substrate when forming the fine clock mark 6.

In this process, no exposure is carried out by the Ch-A optical system around the area where the fine clock mark 6 is formed and accordingly, the width of the groove 4 is reduced. That is, around the area where the fine clock mark 6 is formed, a signal to be recorded or reproduced is distorted, and it is preferable not to record a data signal.

Such an area where no data signal is recorded should be as small as possible from the view point of a high recording density. However, as a lag is involved in adjustment of the optical system, during beam exposure, actually, a lag is generated between the straight spot 44 and the wobbling spot 45 in the direction vertical to the radius direction of the glass substrate 10. It should be noted that this lag in the direction vertical to the radius direction of the glass substrate 10 is adjusted to be within approximately 0.3 $\mu$m.

Moreover, there is a case that a lag is generated between the modulation timing of the Ch-A modulation block 23A and the modulation timing of the Ch-B modulation block 23B. This lag caused by the modulation timing difference results in that even if a modulation signal is supplied to the Ch-A acoustic-optical modulator 35A and the Ch-B acoustic-optical modulator 35B, there is generated approximately 0.2 $\mu$sec of time lag at maximum in the rise of the modulation signal between the Ch-A and the Ch-B.

These lags due to the adjustment of the optical system and the modulation timing of the modulation blocks 23A and 23B result in that when the fine clock mark 6 is formed, the straight spot 44 is overlapped on the wobbling spot 45. In order to evade this, the acoustic-optical modulator 23A is supplied with a Ch-A recording signal having a margin time $T_2$ which disables exposure by the straight spot for a period of time longer than the time required for forming the fine clock mark 6.

Consequently, as the linear velocity in the direction vertical to the radius direction of the glass substrate 10 during an exposure is approximately 1 m/s at minimum, a margin of 0.3 $\mu$sec is sufficient to cope with the spot lag within 0.3 $\mu$m due to the optical system adjustment. This 0.3 $\mu$sec margin is added to the maximum modulation timing lag of 0.2 $\mu$sec to obtain the total of 0.5 $\mu$sec, which is added before and after the time for forming the fine clock mark 6 to define the time to keep OFF the modulator 35A of the Ch-A optical system. This margin time $T_2$ may be reduced by the optical system adjustment.

That is, as shown in 19A, the Ch-A recording signal is supplied as the light ON level to the acoustic-optical modulator 35A prior to forming the fine clock mark 6. Next, during the formation of the fine clock mark 6 and the margin tine T2 before and after this formation, the Ch-A recording signal is supplied as the light OFF level to the Ch-A acoustic-optical modulator 35A. Next, after the fine clock mark 6 is formed and the margin time T2 has elapsed the Ch-A recording signal is supplied again as the light ON level to the acoustic-optical modulator 35A.

On the other hand, as shown in FIG. 19B, the Ch-B recording signal is supplied continuously as the light ON level to the acoustic-optical modulator 35B.

Moreover, as shown in FIG. 19C, the wobbling signal makes to supply the AOD 40 with a signal which wobbles the spot of the Ch-B with the amplitude of approximately ±30 nm before the margin time $T_2$ preceding the formation of the fine clock mark 6 and after the margin time $T_2$ following the formation of the fine clock time 6. During the formation of the fine clock mark 6, the wobbling signal makes to supply the COD 40 with a signal which wobbles the wobbling spot 45 with the amplitude of approximately ±50 to 100 nm.

Thus, by using the Ch-A recording signal and the Ch-B recording signal at the light ON level and the wobbling signal which causes wobbling with the amplitude of ±30 nm, it is possible to form a latent image in the photo-resist layer 11 which forms a groove 4 having the first wall 4a wobbled and the second wall 4b straight.

In the disc master produced according to this production method, the fine clock mark 6 can be recorded without overlap between the straight spot 44 and the wobbling spot 45 because the beam from the Ch-A optical system is kept in the light OFF state and the beam from the Ch-B optical system is kept in the light ON state when carrying out a recording in the area where the fine clock mark 6 is recorded. Consequently, according to this disc master production method, it is possible to form a fine clock mark 6 without configuration distortion even when forming a groove 4 having one of the walls wobbled. Moreover, according to this disc master production method, the margin time $T_2$ is set before and after the formation of the fine clock mark 5, which eliminates overlap between the straight spot 44 and the wobbling spot even if a lag is generated in the optical system or in the modulation timing, and enables to form a fine clock mark 6 without configuration distortion. It should be noted that the wobbling frequency used for forming the fine clock mark should be set higher than the wobbling frequency used for other than a fine clock mark area such as an address area.

As has thus far been described, in the recording medium master production method according to the present invention, in the exposure step for exposing a predetermined area of the aforementioned photo-sensitive layer for forming at least a groove, when exposing an area other than the area where a synchronous signal is to be recorded, a first beam is applied for exposure to form one of the walls of the groove and a second beam is applied for exposure to form the other wall while being wobbled according to at least an address signal; and when exposing the area where the synchronous signal is to be recorded, only the second beam is used for exposure to form the groove while being wobbled according to the synchronous signal. Consequently, the groove formed by the first beam will not overlap with the groove formed by the second beam. Therefore, according to this recording medium master production method, it is possible to record a synchronous signal having no waveform distortion.

Moreover, in the recording medium according to the present invention, at least one groove is formed on the recording plane, wherein in an area containing no synchronous signal recorded, one of the walls of the groove is formed straight and the other wall of the groove is at least partially meandered according to an address signal; and in an area containing a synchronous signal recorded, both of the walls of the groove are meandered according to the synchronous signal. Consequently, when recording or reproducing a data signal, it is possible to obtain a large reproduction output of the synchronous signal. Therefore, according to this recording medium, a synchronous signal alone can be inserted, enabling to increase the area for recording a data signal, which enhances the recording medium recording density.

What is claimed is:

1. A recording medium master production method comprising:

a step for forming a photo-sensitive layer on a substrate;

an exposure step for carrying out exposure to a predetermined area of said photo-sensitive layer so as to form at least a groove;

a developing step for developing said photo-sensitive layer which has been exposed in said exposure step; and a master forming step for forming a recording medium master on said photo-sensitive layer which has been developed in said developing step;

wherein said exposure step is characterized in that exposure of an area, other than an area where a synchronous signal is to be recorded, is carried out by a first beam which forms one of the walls of the groove and a second beam which is wobbled at least according to an address signal to form the other wall of the groove;

and exposure of the area where the synchronous signal is to be recorded is carried out only by said second beam which is wobbled according to said synchronous signal.

2. A recording medium master production method as claimed in claim 1, wherein said exposure step is characterized in that the area where the synchronous signal is to be recorded is subjected to exposure for a total time of t wherein 0 $\mu$sec<t<0.5 $\mu$sec added before and after the time for forming the synchronous signal.

3. A recording medium master production method as claimed in claim 1, wherein said synchronous signal is formed by wobbling of a frequency higher than a frequency of the wobbling caused at least according to the address signal.

4. The method as set forth in claim 1, wherein said exposure step is characterized in that exposure of an area where no synchronous signal is recorded where one of the walls of the groove is formed straight and the other wall of the groove is at least partially meandered according to a said address signal.

* * * * *